(12) United States Patent
Zhang (10) Patent No.: US 11,502,348 B2
(45) Date of Patent: Nov. 15, 2022

(54) BATTERY MODULE (71) Applicant: Jiangsu Contemporary Amperex Technology Limited, Jiangsu (CN)

(72) Inventor: Hua Zhang, Jiangsu (CN)

(73) Assignee: Jiangsu Contemporary Amperex Technology Limited, Changzhou (CN)

( * ) Notice: Subject to any disclaimer, the term of this patent is extended or adjusted under 35 U.S.C. 154(b) by 5 days.

(21) Appl. No.: 17/389,336

(22) Filed: Jul. 30, 2021

(65) Prior Publication Data
US 2021/0359356 A1 Nov. 18, 2021

Related U.S. Application Data (63) Continuation of application No. 16/498,118, filed as application No. PCT/CN2019/095040 on Jul. 8, 2019, now Pat. No. 11,121,420.

(30) Foreign Application Priority Data

Jun. 28, 2019 (CN) .......................... 201921005581.2

(51) Int. Cl.
*H01M 4/02* (2006.01)
*H01M 10/6554* (2014.01)
*H01M 10/42* (2006.01)
*H01M 50/10* (2021.01)
*H01M 50/20* (2021.01)
*H01M 50/147* (2021.01)

(52) U.S. Cl.
CPC ... *H01M 10/6554* (2015.04); *H01M 10/4207* (2013.01); *H01M 50/10* (2021.01); *H01M 50/147* (2021.01); *H01M 50/20* (2021.01)

(58) Field of Classification Search
CPC ....................................................... H01M 4/02
See application file for complete search history.

(56) References Cited

U.S. PATENT DOCUMENTS

2018/0212292 A1 7/2018 Maguire et al.
2018/0366794 A1* 12/2018 Kim .................... H01M 10/613

FOREIGN PATENT DOCUMENTS

| CN | 105009321 A | 10/2015 |
|---|---|---|
| CN | 205846171 U | 12/2016 |
| DE | 102010012993 A1 | 9/2011 |

OTHER PUBLICATIONS

The International search report for PCT Application No. PCT/CN2019/095040, dated Apr. 8, 2020, 9 pages.
The extended European search report for EP Application No. 19769702.2, dated May 21, 2021, 6 pages.

* cited by examiner

*Primary Examiner* — Jacob B Marks
(74) *Attorney, Agent, or Firm* — East IP P.C.

(57) ABSTRACT

The present disclosure relates to the technical field of energy storage devices, and particularly, to a battery module. The battery module includes a lower case, a plurality of battery cells sequentially stacked and received in the lower case, and a heat conducting plate. The lower case is provided with an engaging groove, the heat conducting plate is provided with an inserted portion, and the inserted portion is inserted and fitted in the engaging groove. In the battery module according to the present disclosure, through a fitting insertion of the inserted portion in the engaging groove, a stable connection structure can be formed between the heat conducting plate and the lower case, thereby ensuring the structural stability of the battery module.

10 Claims, 6 Drawing Sheets

BATTERY MODULE

CROSS REFERENCE TO RELATED APPLICATION

This application is a continuation of U.S. patent application Ser. No. 16/498,118 filed on Sep. 26, 2019, which is a national stage of the International Application No. PCT/CN2019/095040, filed on Jul. 8, 2019 and claiming priority to Chinese Patent Application No. 201921005581.2 filed on Jun. 28, 2019, all of which are hereby incorporated by reference in their entireties.

TECHNICAL FIELD

The present disclosure relates to the field of energy storage devices, and particularly, to a battery module.

BACKGROUND

A battery module is generally used as an energy storage system of a new energy vehicle, and the existing battery module includes a metal lower case. The metal lower case may generate spatter when being welded with other components such as an upper cover, and thus can lead to functional failures of other components. In addition, the metal lower case has a great weight and a lot of parts thereof are required to be electrically insulated. Once the insulation function of some parts fails, the quality of the battery module may be problematic.

A heat conducting plate is usually provided to dissipate heat from the battery module. When the lower case is welded to the heat conducting plate, the above-mentioned spattering problem also exists. Therefore, it is urgent to find a solution how to form a stable connection between the lower case and the heat conducting plate.

SUMMARY

The present disclosure provides a battery module, aiming to solve the problems in the related art and achieve a stable connection between the lower case and the heat conducing plate.

The present disclosure provides a battery module, including a lower case; a plurality of battery cells sequentially stacked and received in the lower case; and a heat conducting plate The lower case is provided with an engaging groove, the heat conducting plate is provided with an inserted portion, and the inserted portion is inserted and fitted in the engaging groove, wherein the heat conducting plate and the lower case are formed in a split structure.

In an embodiment, the lower case is made of an insulating material.

In an embodiment, the heat conducting plate is made of metal.

In an embodiment, a receiving hole is formed in the inserted portion, and the lower case forms a hot rivet connecting portion in the receiving hole.

In an embodiment, the lower case includes two side plates and two bent plates. Each of the two side plates includes a first plate and a second plate that are connected in an L shape, the first plate extends in a height direction of the battery module, and the second plate extends in a width direction of the battery module. Each of the two bent plates includes a third plate and a fourth plate that are connected in an L shape, the third plate extends in the height direction of the battery module and is connected to the first plate, and the fourth plate extends in the width direction of the battery module. The second plate, the third plate and the fourth plate define the engaging groove.

In an embodiment, each of the two side plates and a corresponding one of the two bent plates are injection molded into one piece.

In an embodiment, a plurality of receiving holes is provided, and the plurality of receiving holes is arranged at an edge portion of the heat conducting plate along a length direction of the battery module.

In an embodiment, the lower case further includes two end plates disposed at two ends of the battery module along a length direction of the battery module, and the two end plates are fixedly connected to the two side plates, respectively.

In an embodiment, the lower case is provided therein with a heat conducting structural adhesive fixed at a bottom of the lower case.

In an embodiment, the battery module further includes an upper cover, the upper cover and the lower case define a receiving cavity for receiving the plurality of the battery cells.

The technical solutions provided by the present disclosure can bring the following beneficial effects.

The battery module provided by the present disclosure includes a lower case, a plurality of battery cells sequentially stacked and received in the lower case, and a heat conducting plate. The lower case is provided with an engaging groove, the heat conducting plate is provided with an inserted portion, and the inserted portion is inserted and fitted in the engaging groove. Through the inserting and fitting of the inserted portion in the engaging groove, a stable connection structure can be formed between the heat conducting plate and the lower case, thereby ensuring the structural stability of the battery module.

It should be understood that the above general description and the following detailed description are merely illustrative and are not intended to limit the present disclosure.

DESCRIPTION OF DRAWINGS

In order to more clearly illustrate the technical solutions of the present disclosure or in the related art, drawings used in the specific embodiments or the description of the related art will be briefly described below. The drawings introduced as below merely illustrate some embodiments of the present disclosure, and those skilled in the art can obtain other drawings based on these drawings without any creative efforts.

REFERENCE SIGNS 1 battery module;
11 lower case;
111 side plate;
111a first plate;
111b second plate;
112 bent plate;
112a third plate;
112b fourth plate;
112c hot rivet connecting portion;
113 end plate;
114 engaging groove;
12 battery cell;
13 top cover;
14 structural adhesive;
15 heat conducting plate;
151 inserted portion;
152 receiving hole.

The drawings described herein, which illustrate the embodiments of the present disclosure, are incorporated in and constitute a part of the specification, and used to explain the principles of the present application in combination with the specification.

DESCRIPTION OF EMBODIMENTS

The technical solutions of the present disclosure will be clearly and thoroughly described as follow with reference to the accompanying drawings. It is obvious that the described embodiments are parts of the present disclosure, rather than all embodiments. Based on the embodiments of the present disclosure, all other embodiments obtained by those skilled in the art without paying any inventive efforts shall fall within the protection scope of the present disclosure.

Figure 1:
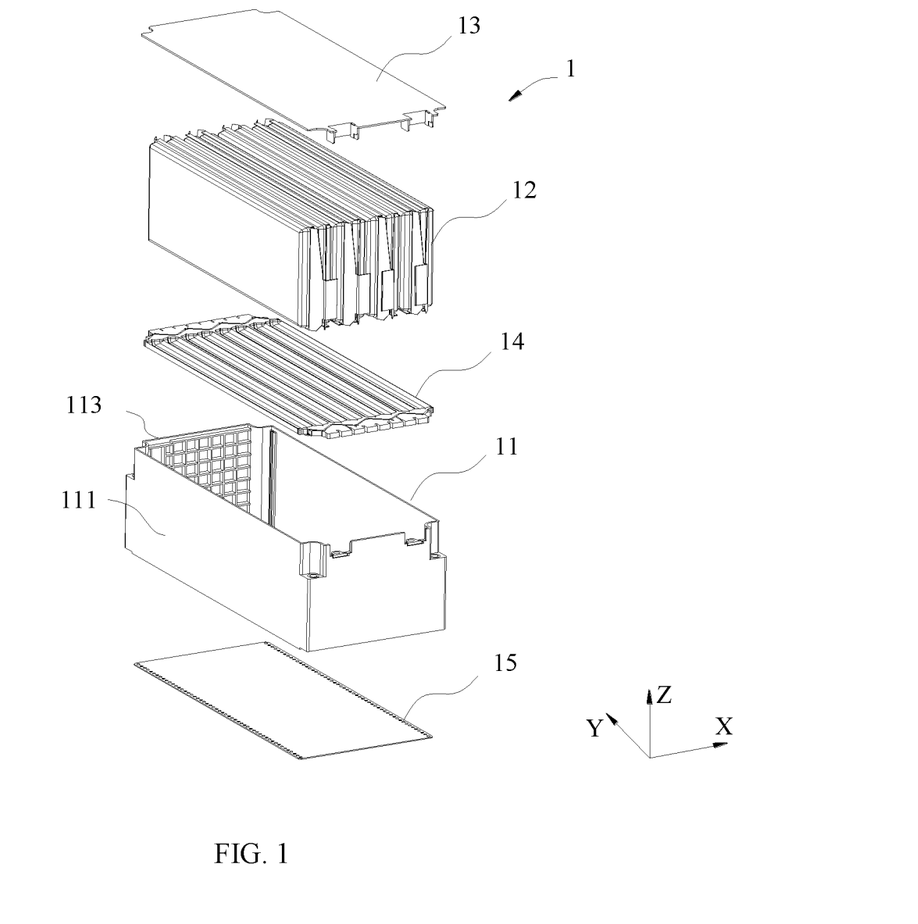
FIG. 1 is an exploded view of a battery module provided in an embodiment of the present disclosure.

FIG. 1 is an exploded view of a battery module provided in an embodiment of the present disclosure. As shown in FIG. 1, the embodiment of the present disclosure provides a battery module 1. The battery module 1 includes a lower case 11, a plurality of battery cells 12 sequentially stacked and received in the lower case 11, and an upper cover 13. The upper cover 13 and the lower case 11 together form a receiving cavity for receiving the plurality of battery cells 12.

An electrode assembly and electrolyte are disposed in the battery cell 12, and the electrode assembly electrochemically reacts with the electrolyte to output electric energy. Since heat generated during the reaction should be dissipated in time, the battery module 1 further includes a heat conducting plate 15 for heat dissipation.

In an embodiment, the battery module 1 can include two side plates 111 and two end plates 113. The side plates 111 and the end plates 113 fix the battery cells 12 to restrict the expansion of the battery cells 12. The heat conducting plate 15 can be connected to ends of the side plates 111 and the end plates 113 facing away from the upper cover 13, i.e., being connected to bottom ends of the side plates 111 and the end plates 113. When the plurality of battery cells 12 is disposed in the lower case 11, the heat can be dissipated through the heat conducting plate 15.

Figure 2:
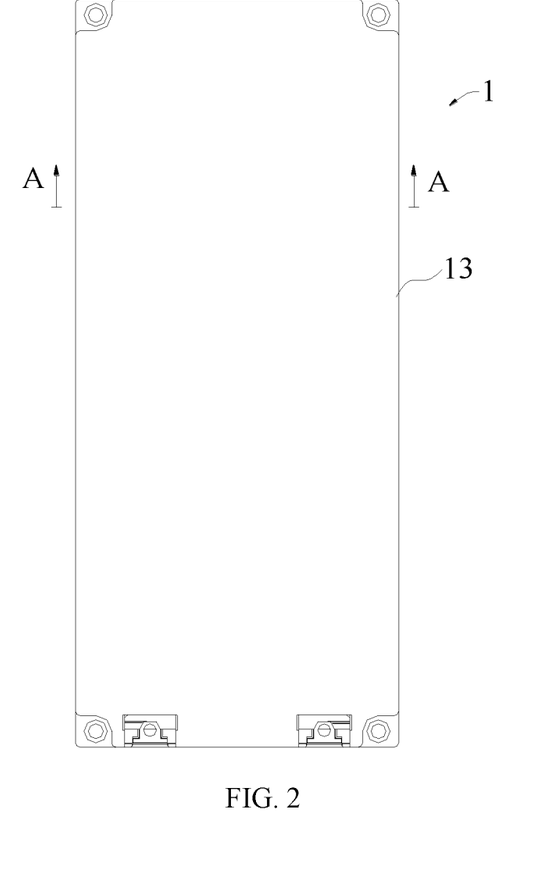
FIG. 2 is a top view of a battery module provided in an embodiment of the present disclosure.
Figure 3:
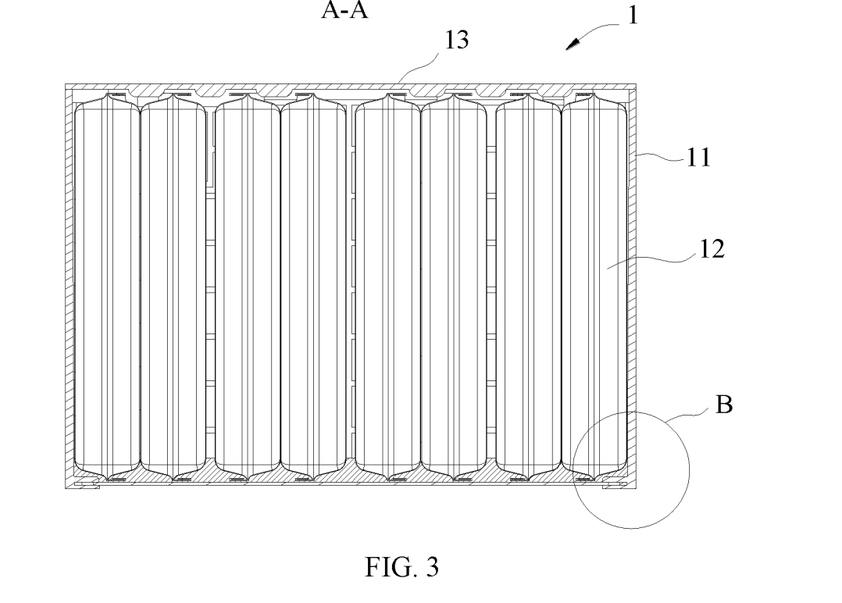
FIG. 3 is a cross-sectional view taken along line A-A in FIG. 2.
Figure 4:
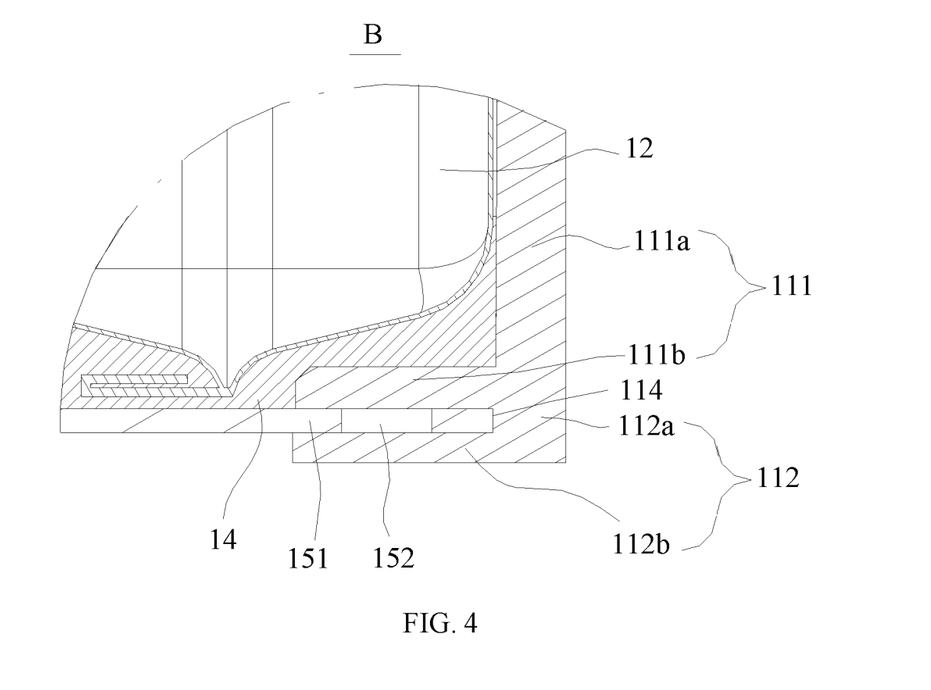
FIG. 4 is an enlarged view of a portion B in FIG. 3.

FIG. 2 is a top view of a battery module provided in an embodiment of the present disclosure, FIG. 3 is a cross-sectional view taken along line A-A in FIG. 2, and FIG. 4 is an enlarged view of a portion B in FIG. 3.

As shown in FIG. 2 to FIG. 4, an engaging groove 114 is formed in the lower case 11, and an inserted portion 151 is formed in the heat conducting plate 15. The inserted portion 151 can be formed at an edge portion of the heat conducting plate 15, and the inserted portion 151 is inserted in and fitted in the engaging groove 114. By adjusting a fit tolerance between the inserted portion 151 and the engaging groove 114, the inserted portion 151 can be inserted in the engaging groove 114 in a tighter way, thereby achieving a stable connection between the heat conducting plate 15 and the lower case 11 and ensuring the structural strength of the battery module 1.

The lower case 11 and the heat conducting plate 15 adopt a split structure as described above, and the inserted portion 151 is then inserted into and fixed to the engaging groove 114. Then, the lower case 11 made of an insulating material can be used to solve the splashing problem of the metal lower case during the welding process. In addition, the weight of the battery module 1 can be reduced, and a metal heat conducting plate 15 can be still used for the heat dissipation of the battery cells 12. Further, the lower case 11 made of an insulating material can solve problems such as many parts of the metal lower case are required to be insulated and insulations are often ineffective.

Figure 5:
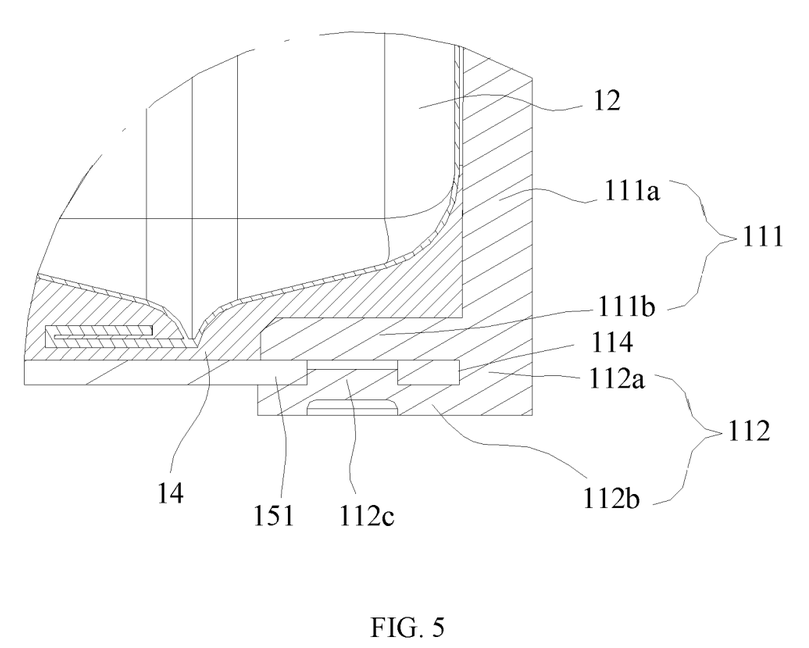
FIG. 5 is a cross-sectional view showing a state in which a lower case and a heat conducting plate are to be fitted with each other.

For example, a receiving hole 152 is formed in the inserted portion 151, the inserted portion 151 is inserted into the engaging groove 114, and the lower case 11 forms a hot rivet connecting portion 112c in the receiving hole 152, as shown in FIG. 5.

FIG. 5 is a cross-sectional view showing a state in which the lower case and the heat conducting plate are to be fitted with each other after a hot riveting. Referring to FIG. 4, the inserted portion 151 is inserted into the engaging groove 114 until the receiving hole 152 is completely located in the engaging groove 114, and then the bottom portion of the lower case 11 is hot-riveted to form the structure shown in FIG. 5. In the embodiment shown in FIG. 5, the lower case 11 includes a bent plate 112, and a bottom of a fourth plate 112d of the bent plate 112 is hot-riveted to form the hot rivet connecting portion 112c, which will be specifically described below.

A portion of the material of the lower case 11 is melted during the hot riveting process, and the molten portion flows into the receiving hole 152 and then forms the hot rivet connecting portion 112c as shown in FIG. 4 after cooling, so as to lock the heat conducting plate 15. By forming the hot rivet connecting portion 112c in the receiving hole 152, the heat conducting plate 15 and the lower case 11 are fixed, and a stable connection structure can be formed. In this way, the heat conducting plate 15 is prevented from coming out of the engaging groove 114, thereby further ensuring the structural stability of the lower case 11.

For example, the lower case 11 is made of a polymer material having an insulating property, and is formed by a molding method such as injection molding, extrusion or mold pressing, thereby solving the spattering problem of the metal lower case in the related art during welding and avoiding the failures of other components. Therefore, the quality of the battery module is improved.

The battery cell 12 can have a shape of square or cylindrical, which is not limited herein.

The upper cover 13 can be made of a polymer material having insulating property, and is formed by molding method such as injection molding, extrusion, or mold pressing.

In an embodiment, the heat conducting plate 15 is made of a metal material, which has a higher thermal conductivity than the lower case 11 and the upper cover 13. For example, the heat conducting plate is made of metal such as copper or aluminum, which is not further limited herein.

Figure 6:
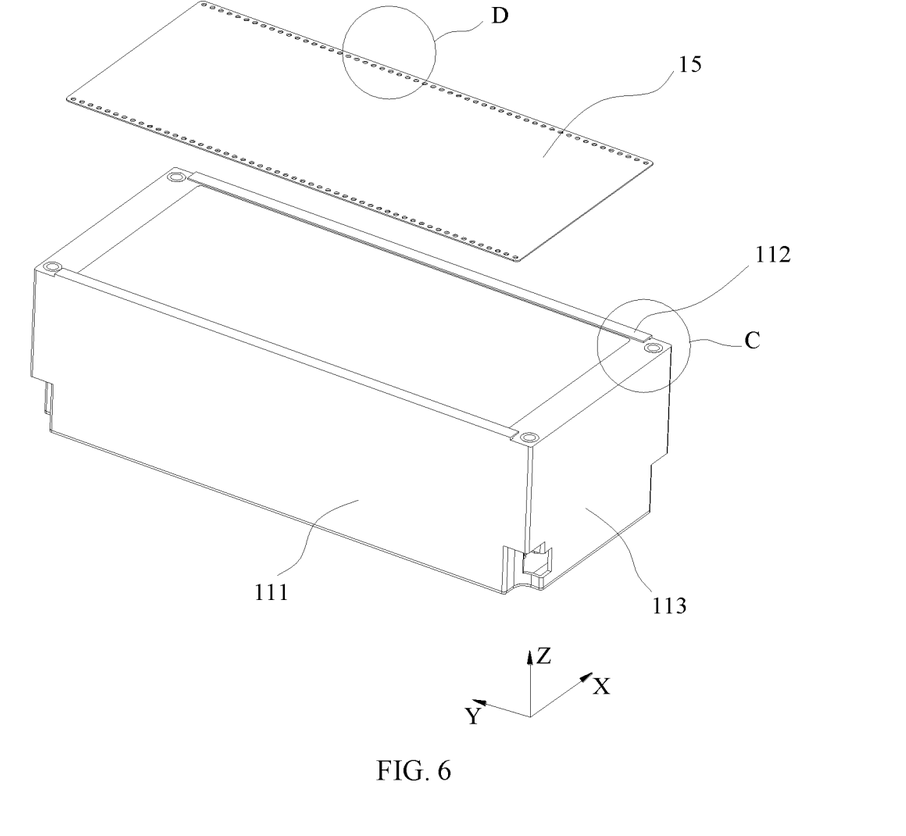
FIG. 6 is an exploded view of a battery module provided in an embodiment of the present disclosure, in which the lower case and the heat conducting plate are fitted with each other.
Figure 7:
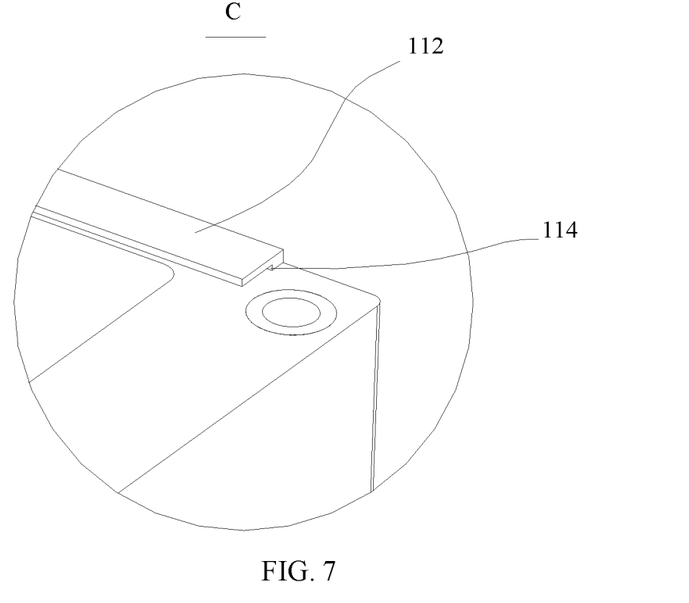
FIG. 7 is an enlarged view of a portion C in FIG. 6.
Figure 8:
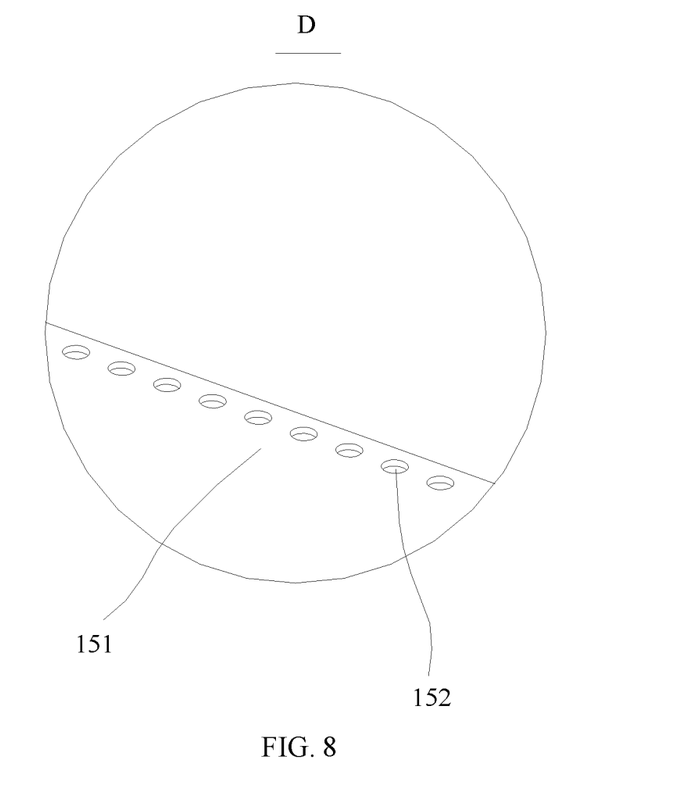
FIG. 8 is an enlarged view of a portion D in FIG. 6.

FIG. 6 is an exploded view of a battery module provided in an embodiment of the present disclosure, in which the lower case and the heat conducting plate are fitted with each other, FIG. 7 is an enlarged view of a portion C in FIG. 6, and FIG. 8 is an enlarged view of a portion D in FIG. 6.

As shown in FIG. 6 and FIG. 7, the engaging groove 114 is formed at the bottom of the lower case 11 in a height direction of the battery module 1, i.e., an end facing away from the upper cover 13. In such arrangement, after the inserted portion 151 of the heat conducting plate 15 is inserted in the engaging groove 114, the heat conducting plate 15 is opposite to the upper cover 13, and the heat conducting plate 15 has a relatively large area. Therefore, the heat of the battery cells 12 can be dissipated in the maximum area, and a better heat dissipation effect can be achieved.

As a preferred embodiment, as shown in FIG. 4 to FIG. 7, the lower case 11 includes two side plates 111 and two bent plates 112. Each side plate 111 includes a first plate 111a and a second plate 111b that are connected in an L shape. The first plate 111a extends in the height direction (direction Z) of the battery module 1, and the second plate 111b extends in a width direction (direction X) of the battery module 1. Each bent plate 112 includes a third plate 112a and a fourth plate 112b that are connected in an L shape. The third plate 112a extends in the height direction (direction Z) of the battery module 1 and is connected to the first plate 111a, and the fourth plate 112b extends in the width direction (direction X) of the battery module 1. The second plate 111b, the third platen 112a and the fourth plate 112b define the engaging groove 14.

The first plate 111a, second plate 111b, the third platen 112a and the fourth plate 112b are injection molded into one piece. This is, the side plate 111 and the bent plate 112 are injection molded into one piece, so as to form the above-mentioned engaging groove 14.

As the engaging groove 114 is formed by the side plate 111 and the bent plate 112, the engaging groove 114 can extend along a length direction (direction Y) of the battery module 1, and after being fitted with the heat conducting plate 15, an engaging area is relatively large, thereby increasing the connection reliability of the heat conducting plate 15.

As shown in FIG. 8, the heat conducting plate 15 can be a rectangular plate, and a plurality of receiving holes 152 is provided. The plurality of receiving holes 152 is arranged at an edge portion of the heat conducting plate 15 along the length direction (direction Y) of the battery module 1. In this way, when the heat conducting plate 15 and the lower case 11 are hot riveted, only a small part of the heat conducting plate 15 absorbs heat, thereby avoiding a thermal deformation when the entire heat conducting plate 15 absorbs heat. When the heat conducting plate 15 is deformed, a contact area with an external heat conducting member is reduced, and thus the heat conduction effect is negative affected. The above-mentioned structure can guarantee a good heat conduction effect of the heat conducting plate 15. In addition, since only a small portion of the heat conducting plate 15 absorbs heat, a significant deformation of the heat conducting plate 15, as known in the related art, will not occur, and thus flatness will not be greatly affected. Therefore, the battery cells 12 are unlikely to shake after being assembled, and the stability of the battery module 1 is improved.

In an embodiment, the lower case 11 further includes two end plates 113 that are disposed at two ends of the battery module 1 in the length direction. The two end plates 113 are fixedly connected to the two side plates 111, in order to restrict the expansion of the battery cells 12.

The above-mentioned engaging groove 114 can also be formed on the end plate 113. That is, the engaging groove 114 is formed by the bent plate 112 and the end plate 113, and thus the engaging groove 114 extends along the width direction (direction X) of the battery module 1. In the present embodiment, the receiving holes 152 are arranged at the edge portion of the heat proceeding plate 15 along the width direction (direction X) of the battery module 1.

In an embodiment, the lower case 11 is provided with a structural adhesive 14 fixed to the lower case 11, and the structural adhesive 14 is preferably a heating conducting structural adhesive. During the assembling of the battery module 1, the lower case 11, the battery cells 12 and the upper cover 13 are assembled first, and then the adhesive is applied. Thus, the application of the adhesive can be monitored in real time, so as to ensure a good application effect of the adhesive. After the adhesive is applied, the inserted portion 151 of the heat conducting plate 15 is inserted into the engaging groove 114 of the lower case 11 to form a stable connection between the heat conducting plate 15 and the lower case 11. In addition, the heating conducting structural adhesive is conducive to the heat transfer, and further improve the heat dissipation effect of the battery module 1.

After the inserted portion 151 of the heat conducting plate 15 is inserted in the engaging groove 114 of the lower case 11, the hot riveting is performed in such manner that the molten material of the lower case 11 flows into the receiving hole 152 in the heat conducting plate 15 and forms the hot rivet connecting portion 112c after cooling. Therefore, the connection stability between the heat conducting plate 15 and the lower case 11 is further improved, and the structural strength of the battery module 1 is guaranteed.

The preferable embodiments of the present disclosure described above are not intended to limit the claims. Those skilled in the art can make various modifications and changes. Any modification, equivalent substitution and improvement made without departing from the concept of the present disclosure shall fall within the protection scope of the present disclosure.

What is claimed is:

1. A battery module, comprising:
    a lower case;
    a plurality of battery cells sequentially stacked and received in the lower case; and
    a heat conducting plate,
    wherein the lower case is provided with an engaging groove, the heat conducting plate is provided with an inserted portion, and the inserted portion is inserted and fitted in the engaging groove, and
    wherein the heat conducting plate and the lower case are formed in a split structure.

2. The battery module according to claim 1, wherein the lower case is made of an insulating material.

3. The battery module according to claim 1, wherein the heat conducting plate is made of metal.

4. The battery module according to claim 1, wherein a receiving hole is formed in the inserted portion, and the lower case forms a hot rivet connecting portion in the receiving hole.

5. The battery module according to claim 4, wherein the lower case comprises two side plates and two bent plates;

each of the two side plates comprises a first plate and a second plate that are connected in an L shape, the first plate extends in a height direction of the battery module, and the second plate extends in a width direction of the battery module;

each of the two bent plates comprises a third plate and a fourth plate that are connected in an L shape, the third plate extends in the height direction of the battery module and is connected to the first plate, and the fourth plate extends in the width direction of the battery module; and the second plate, the third plate and the fourth plate define the engaging groove.

6. The battery module according to claim 5, wherein each of the two side plates and a corresponding one of the two bent plates are injection molded into one piece.

7. The battery module according to claim 4, wherein a plurality of receiving holes is provided, and the plurality of receiving holes is arranged at an edge portion of the heat conducting plate along a length direction of the battery module.

8. The battery module according to claim 4, wherein the lower case further comprises two end plates disposed at two ends of the battery module along a length direction of the battery module, and the two end plates are fixedly connected to the two side plates, respectively.

9. The battery module according to claim 1, wherein the lower case is provided therein with a heat conducting structural adhesive fixed at a bottom of the lower case.

10. The battery module according to claim 1, further comprising an upper cover, wherein the upper cover and the lower case define a receiving cavity for receiving the plurality of the battery cells.

* * * * *